May 5, 1970   E. GRUBER ET AL   3,510,184
ADJUSTABLE BEARING
Filed May 16, 1968
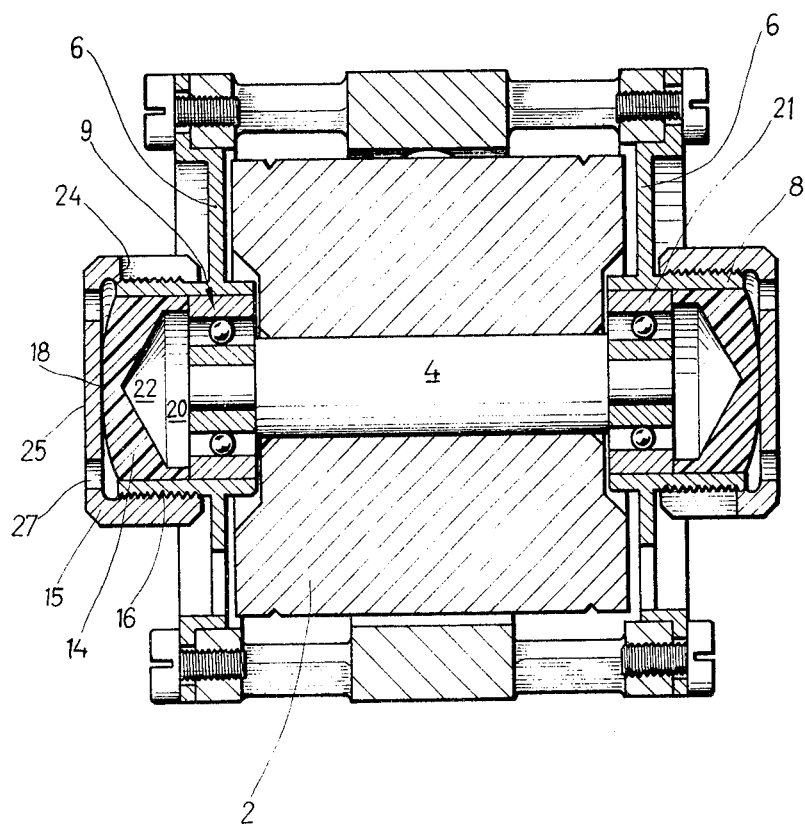
Inventors:
Ernst Gruber
Herbert Fuhr
by  Attorneys United States Patent Office 3,510,184
Patented May 5, 1970

3,510,184
ADJUSTABLE BEARING
Ernst Gruber and Herbert Fuhr, Munich, Germany, assignors to Bolkow Gesellschaft mit beschrankter Haftung, Ottobrunn, near Munich, Germany
Filed May 16, 1968, Ser. No. 729,574
Claims priority, application Germany, May 20, 1967, B 71,054
Int. Cl. F16c 13/06
U.S. Cl. 308—189                 3 Claims

ABSTRACT OF THE DISCLOSURE

An adjustable bearing is formed of an axially positionable ball bearing disposed within one end of a bushing. A cap member is threaded onto and is adjustably positionable on the other end of the bushing. A pressure member is located within the bushing in contact with the cap member and the ball bearing. By adjusting the cap member, the pressure member in turn axially positions the ball bearing within the bushing. The portion of the pressure member contacting the cap member has a globular shape to afford an approximately punctiform area of contact with the cap member.

Summary of the invention

The present invention is directed to an adjustable bearing capable of mounting gyroscope rotors, and, more particularly, it is directed to a ball bearing axially positionable within a bushing.

One factor that must be considered in mounting a gyroscope rotor within a Cardan frame is that its center of gravity must be located on a line which joins the centers of the frame. Since manufacturing tolerances can never be completely avoided, gyroscope rotors, as a rule, are designed to be adjustably positionable, to some extent, within their bearings. Such adjustable bearings must provide a high degree of accuracy and there is little room available with a Cardan frame to accommodate the individual bearings. Moreover, the bearing seats in a Cardan frame must be adjustable so as to align with one another in a simple and easy manner.

It is the primary object of the present invention to provide a bearing of relatively small size and of high adjustment accuracy which is adapted for mounting the shaft of a gyroscope rotor in a Cardan frame.

Another object of the invention is to provide a cap in threaded engagement with a bushing, whereby a ball bearing is axially positionable within the bushing by adjusting the position of the cap on the bushing.

Yet, another object of the invention is to provide a pressure member spaced between and in contact with the ball bearing and the cap member for properly positioning the ball bearing.

Still another object of the invention is to provide a configuration for the surface of the pressure member in contact with the cap member, whereby a point-type contact is achieved between them.

Moreover, another object of the invention is to provide a cap construction which will avoid play between the cap and the bushing to provide the optimum accuracy in adjusting the ball bearing.

Therefore, in accordance with the present invention, an adjustable bearing especially suited for mounting the shaft of a gyroscope rotor is provided by an axially positionable ball bearing disposed within the bore of a bushing. A pressure member is disposed within the bore between and in contact with the ball bearing and a cap member threaded onto the bushing. The surface of the pressure member in contact with the cap is spherical or globular in form to provide the desired point-like or punctiform contact between the cap and the pressure member. The cap member has slits formed through its threaded surface in contact with the outer surface of the bushing.

For simple axial adjustment of the ball bearing within the bushing, the position of the cap member in threaded engagement with the exterior of the bushing is varied and, in turn, the cap through the medium of the pressure member positions the ball bearing within the bushing. With a gyroscope rotor positioned at each end within such adjustable bearings, its position within its Cardan frame can be adjusted in an easy, simple and accurate manner. Furthermore, the slitted cap can be prestressed and therefore mounted on the bushing without any play. As indicated previously, the spherical or globular curved surface of the pressure piece contacting the cap assures an approximately punctiform contact between these two members to assure that there is no problem of uneven contact between them and, as a result, accurate adjustment of the bearing seats for the rotor shaft is easily achieved.

The material used for the pressure piece must have a relatively large coefficient of expansion when the rotor shaft is made from a material having a small coefficient and the material of the Cardan frame has a high coefficient of expansion, whereby the position of the bearing remains essentially constant with changes in temperature. With the use of slits in the threaded cap and the prestress provided in the cap, there is no play in the threaded engagement of the cap on the bushing so that its position does not have to be checked once it is set. As a protection against the cap turning on the bushing, it is sufficient to provide a safety lacquer or a similar safety material or device deposited after the adjustment has been made.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

Brief description of the drawings

The drawing illustrates a view, partly in section, through a Cardan frame with an adjustable bearing, in accordance with the present invention, positioned on the opposite ends of a gyroscope rotor mounted in the Cardan frame.

Detailed description of the preferred embodiment

In the drawing, a gyroscope rotor 2 is mounted by means of its shaft 4 in a Cardan frame 6. Positioned on opposite sides of the Cardan frame are bushings 8 each containing an axially positionable ball bearing 9 disposed on the ends of the rotor shaft. The bearing bushings 8 extend outwardly from the ends of the rotor shaft. Disposed within the bore of each bushing 8, outwardly from the ball bearing 9, is a pressure member 14 having a cylindrically-shaped periphery in contact with the inner surface of the bushing. The portion of the pressure member 14 facing toward the ball bearing has a cylindrical recess 20 whose diameter corresponds roughly to the inside diameter of the outer race 21 of the ball bearing 9, however, this diameter cannot be less than the inside diameter of the outer race. A conically-shaped recess 22 extends from the cylindrical recess 20 into the pressure member. The surface 18 of the pressure member facing oppositely from the cylindrical recess 20 has a spherical or globular shape and is in contact with the inner surface of a cap member 15 which is in threaded engagement with a threaded surface 16 on the exterior end portion of the bushing 8. Slits 24 are located in the circumferential portion of the cap member in threaded engagement with the bushing, and the cap is prestressed so that clearance between the thread on the cap and the bushing can be properly balanced to avoid any play between these two members and to assure that the cap member is held resiliently in place. The end surface 25 of the cap member extending across the bushing is provided with recesses or openings 27 into which an adjusting tool, not shown, can be inserted for positioning the cap member in threaded engagement on the bushing and, in turn, properly axially adjusting the position of the ball bearing within the bushing.

In view of the preceding description of the adjustable bearing, it will be appreciated that an exact adjustment of the gyro rotor relative to its Cardan frame is accomplished easily and simply by a mutual adjustment of the threaded cap members 15 on the opposite sides of the Cardan frame. Due to the globular-shaped surfaces 18 of the pressure members, it is possible to afford an approximately punctiform contact with the opposite surface of the cap member whereby alignment errors occurring with threaded joints are eliminated and for the first time, the bearings of gyroscope rotors can be adjusted in a fully satisfactory manner by means of the threaded engagement between the cap and the bushing containing the bearing.

While a specific embodiment of the invention has been shown and described in detail to illustrate the application of the inventive principles, it will be understood that the invention may be embodied otherwise without departing from such principles.

What is claimed is:

1. An adjustable bearing comprising an axially extending bushing threaded on its outer surface, a ball bearing supported within said bushing and being axially positionable therein, said ball bearing having an outer race, an axially extending cylindrically shaped unitary pressure member disposed within and closely fitting contact about its circumferential periphery with the interior of said bushing, the first end of said pressure member facing said ball bearing having a cylindrically shaped recess formed therein providing an annular shaped surface encircling the recess, said annular shaped surface being in contact with said outer race of said ball bearing and having an interior diameter at least equal to the interior diameter of said outer race, the second end of said pressure member having a globular shape, a cap member having an end section arranged to extend transversely across one end of said bushing contacting the second end of said pressure member and a cylindrically shaped side surface extending axially from said end section and being threaded on its inner surface for threaded engagement with the exterior surface of said bushing, the surface of said end section of said cap member disposed in contact with the globular shaped second end of said pressure member forming a generally punctiform contact therewith, whereby in threadedly adjusting the position of said cap on said bushing the surface of said end section of said cap member reacts against the globular shaped surface of said pressure member and positions said pressure member within said bushing so that the annular shaped surface on the first end of said pressure member position said ball bearing axially in said bushing.

2. An adjustable bearing, as set forth in claim 1, wherein slits being formed in said side surface of said cap member and extending in the axial direction of said bushing from the free end of said side surface toward said end section, said cap member being prestressed so that in engagement with said bushing there is no play between said cap member and bushing.

3. A adjustable bearing support assembly for a gyroscope rotor comprising a Cardan frame, a pair of axially extending bushings aligned in the opposite sides of said frame, said bushings being threaded on their outer surfaces, a ball bearing supported within each of said bushings and being axially positionable therein, said ball bearings having an outer race, a shaft extending between the opposite sides of said frame and being fitted at its opposite ends into said bearings, said shaft being arranged to mount a gyroscope rotor, an axially extending cylindrically shaped pressure member being disposed within each of said bushings and being in closely fitting contact about its circumferential periphery with the interior of said bushing, the first end of each of said pressure members facing said ball bearing having a cylindrically shaped recess formed therein providing an annular shaped surface encircling the recess, said annular shaped surface being disposed in contacting relationship with the surface of said outer race of said ball bearing and having an interior diameter at least equal to the interior diameter of said outer race, the second end of said pressure member having a globular shape, a cap member having an end section arranged to extend transversely across the end of said bushing and being disposed in contacting relationship with the second end of said pressure member and a cylindrically shaped side surface extending axially from said end surface and being threaded on its inner surface for threaded engagement with the exterior surface of said bushing, the surface of said end section disposed in contacting relationship with the globular shaped second end of said pressure member forming a generally punctiform contact therewith, slits being formed in said side surface of said cap member and extending in the axial direction of said bushing from the free end of said side surface toward said end section, said cap member being prestressed so that in engagement on said bearing there is no play between said cap member and bushing, and whereby in threadedly adjusting the positions of said cap members on said bushings on the opposite sides of said frame the surface of said end sections of said cap members react against the globular shaped surfaces of said pressure members and position said pressure members within said bushings whereby the annular shaped surface of said pressure members position said ball bearings and properly locate said shaft for the gyroscope rotor.

References Cited

UNITED STATES PATENTS

| | | | |
|---|---|---|---|
| 1,053,715 | 2/1913 | Cromwell | 308—89.1 |
| 2,857,765 | 10/1958 | Kiefer | 308—189 |

FOREIGN PATENTS

| | | |
|---|---|---|
| 565,448 | 9/1944 | Great Britain. |
| 817,937 | 8/1959 | Great Britain. |

MARTIN P. SCHWADRON, Primary Examiner

F. SUSKO, Assistant Examiner